April 10, 1962 H. B. DIAMOND 3,028,760
CENTRIFUGALLY RESTRAINED ACCELEROMETER
Filed April 19, 1960 2 Sheets-Sheet 1

INVENTOR
HERBERT B. DIAMOND
BY
ATTORNEY

April 10, 1962 H. B. DIAMOND 3,028,760
CENTRIFUGALLY RESTRAINED ACCELEROMETER
Filed April 19, 1960 2 Sheets-Sheet 2
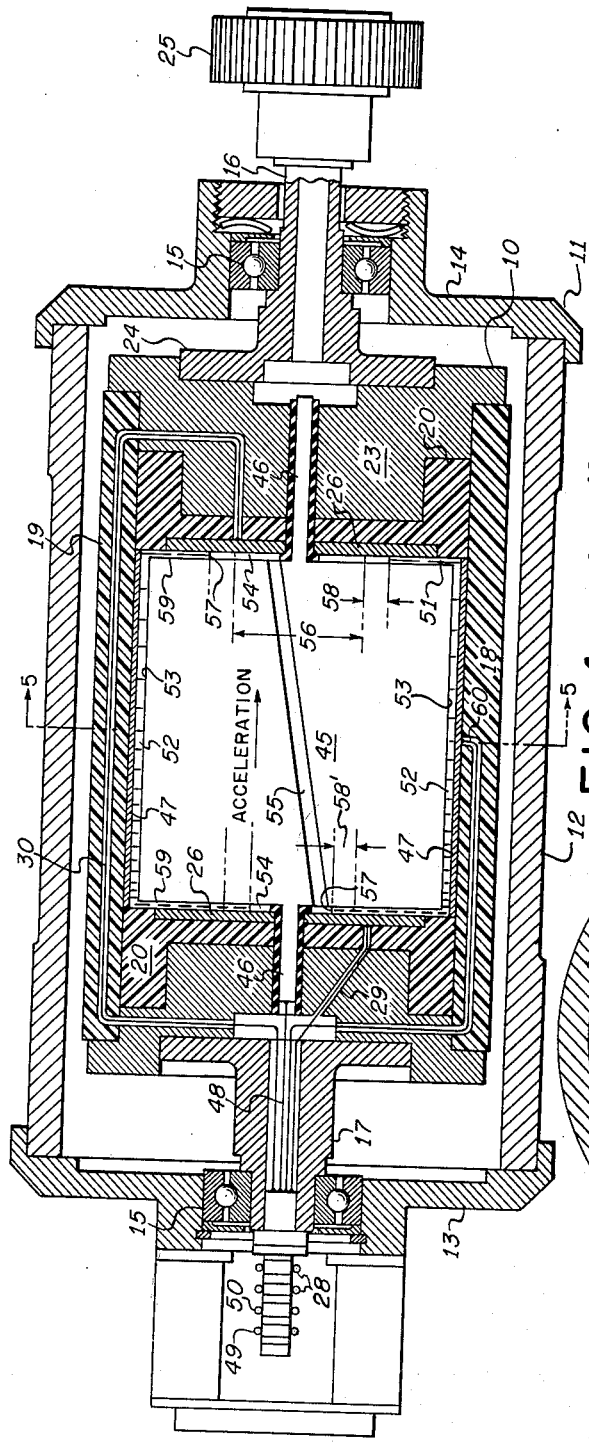
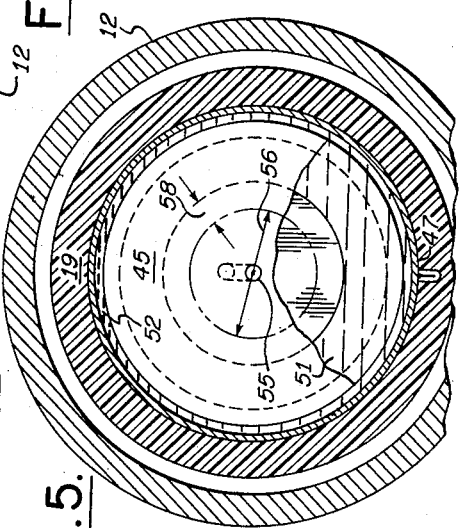
INVENTOR
HERBERT B. DIAMOND
BY
ATTORNEY

# United States Patent Office 3,028,760
Patented Apr. 10, 1962

3,028,760
CENTRIFUGALLY RESTRAINED
ACCELEROMETER
Herbert B. Diamond, Valley Stream, N.Y., assignor to Sperry Rand Corporation, Great Neck, N.Y., a corporation of Delaware
Filed Apr. 19, 1960, Ser. No. 23,328
12 Claims. (Cl. 73—516)

This invention relates to acceleration responsive devices of the type known as linear inertial accelerometers.

While undergoing changes in velocity, these devices provide an indication of the magnitude of the acceleration component in a certain direction by detecting the resulting movements or tendencies toward movement of a mass suspended within them. All such accelerometers are seen to include an inertial mass, a constraining means for limiting the direction of acceleration sensitivity of the mass, a restraining means for suspending the mass and a transducing means for indicating the resulting force or movement of the mass against the restraining means.

Most conventional accelerometers depend upon some mechanical flexure or bending either in the restraining means or in the indicating mechanism. This is found, for instance, in restraining springs or in pressure transducers. These devices also for the most part depend upon slides, pivots and other frictional elements in the constraining means. Such mechanical flexure and friction subjects the instrument to errors under conditions of repeated usage, temperature differences or minute imperfections in materials. These mechanical means furthermore severely limit the threshold or minimum detectable signal to which the device will respond.

Manometric type accelerometers overcome the above-mentioned problems by making use of a liquid as the inertial mass, a container as the constraining means, gravity as the restraining force and resistance electrodes as the indicating system. These devices, however, suffer from non-linearity at the output and further have comparatively slow recovery and long response times which renders them inaccurate under conditions of rapidly repeated accelerations.

It is an object of this invention, therefore, to provide a linear inertial accelerometer which is free from the adverse flexural or frictional effects inherent in mechanically restrained or constrained devices.

It is a further object of this invention to provide a linear indication of acceleration.

It is another object of the invention to provide an accelerometer having an extremely low threshold characteristic in order to indicate minute changes in acceleration.

It is another object of the invention to provide an accelerometer which has a rapid recovery in order to accurately resolve rapidly recurring accelerations.

It is a still further object of the invention to provide an accelerometer which is substantially insensitive to temperature variations, which is simple and accurate and which is easily reproducible.

These objects are accomplished by providing a cylindrical enclosure filled with two fluids, one of which is preferably a liquid while the other may be air. The enclosure is axially aligned with the direction in which acceleration is to be measured and is rotated about its axis to centrfugally distribute the liquid about its periphery. When the cylinder is accelerated along its axis, the liquid will tend toward the end of the enclosure away from the direction of applied acceleration and the shape of the centrifugally restrained surface of the liquid will change from cylindrical to parabolic. The amount of acceleration can be shown to be linearly proportional to the change in areas of circles described on the ends of the enclosure by the rotating liquid. This change in area can easily be detected by making the liquid and air of different electrical conductivities or permittivities and employing them as elements of a variable capacitor at either end of the device. The relative change in capacitance thus becomes a linear function of the amount of acceleration along the centrifugal axis.

Referring now to the figures:

FIG. 4 represents a section view of a preferred embodiment of the invention;

FIG. 5 is a section view taken at 5—5 of FIG. 4;

FIG. 6 is a schematic representation illustrating a manner of metering the embodiment of FIG. 4.

Figure 1:
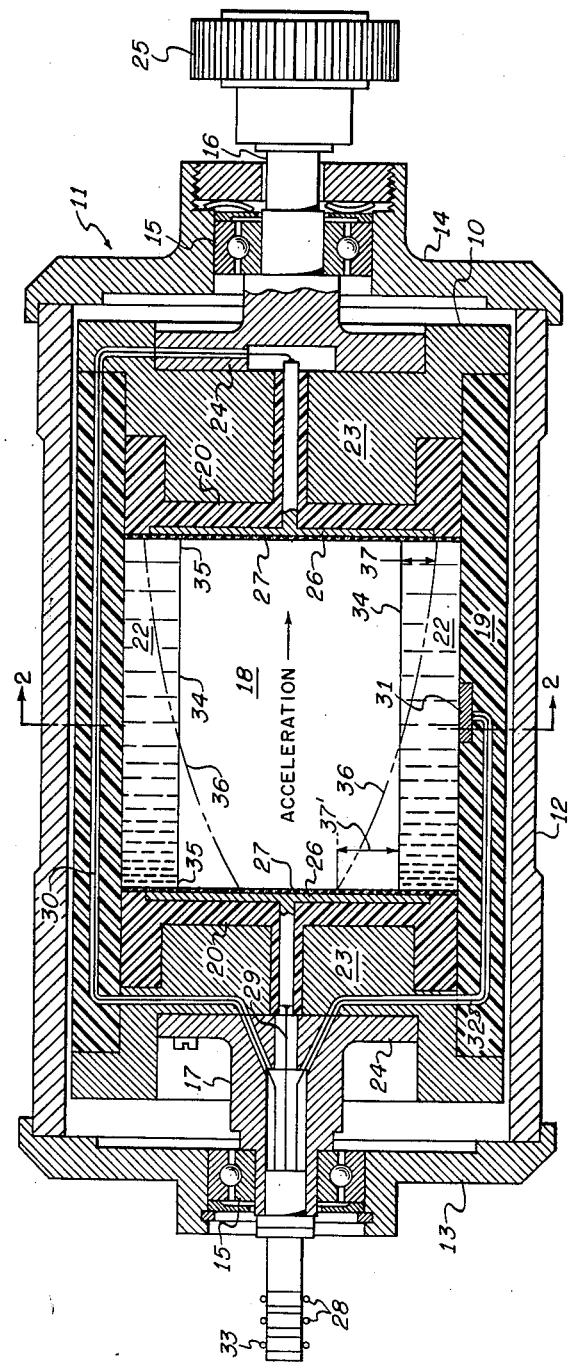
FIG. 1 represents a section view of a first embodiment of the invention.
Figure 2:
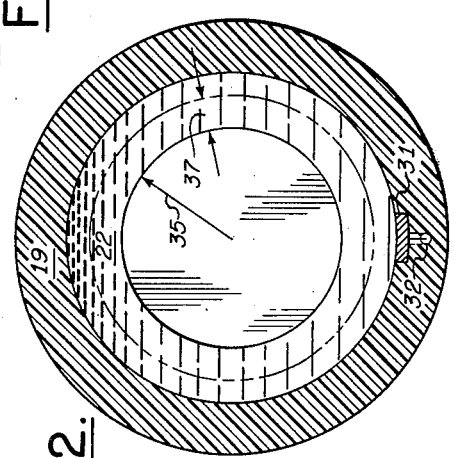
FIG. 2 is a section view taken at 2—2 of FIG. 1.

An accelerometer embodying the principles of the present invention is shown in FIGS. 1 and 2. The device consists basically of a fluid-filled rotor assembly 10 supported within an outer casing 11. The outer casing consists of a tubular cylinder 12 fitted with two end coverings 13 and 14. Bearings 15 are centrally disposed within each of the coverings and serve to support shafts 16 and 17 about which the rotor turns.

The rotor assembly comprises a hermetrically sealed cylindrical enclosure 18 formed by a plastic inner tubular member 19 and two plastic end pieces 20. A quantity of mercury 22 is located within the enclosure and under conditions of rotation centrifugally distributes itself about the periphery. The end pieces 20 are supported by caps 23 which in turn are attached by means of flanges 24 to the input and output shafts 16 and 17 about which the assembly turns. Rotative power is supplied from a motor (not shown) via a drive gear 25 to the input shaft 16.

Electrically conductive discs 26 are imbedded in each of the plastic end pieces 20 and are covered by layer of dielectric material 27 of controlled thickness and dielectric constant. The conductive discs are electrically connected to slip rings 28 on the output shaft 17 by means of conductors 29 and 30 located within the caps and the inner tubular member. A conductor 31 located at the inner surface of the plastic tubular member provides electrical contact with the mercury located in the device. A further conductor 32, electrically connects the mercury with a third slip ring 33.

During operation the turning of the rotor assembly produces rotation of the mercury by means of viscous drag, and centrifugal forces cause the mercury to evenly distribute itself about the periphery of the enclosure. Under conditions of zero acceleration the centrifugally restrained inner surface 34 of the mercury is seen to assume the shape of a cylinder which terminates at each of the end pieces, describing circles 35 of equal diameter on them. As the device is accelerated along its axis of rotation the centrifugally restrained surface 34 of the mercury assumes the shape of a frustum of a paraboloid 36, having parameters which are a function of the applied acceleration. It is to be noted that these parameters are independent of any mechanical flexural or frictional restraint. This is due to the fact that the degree of restraint is entirely a function of the centrifugal forces within the mercury. Also the parabolic parameters are independent of the density of the mercury. This may be explained by observing that while density linearly affects forces in the direction of acceleration, it also linearly affects the centrifugal forces perpendicular to the acceleration. Thus, the direction of the resultant force on individual particles, which is the infinitesimal slope of the parabolic curve, remains the same, independently of the density of the liquid. The effect of the changing paraboloid upon the end pieces is that the size of each of the circles 35 described on them become larger or smaller by an amount 37 and 37' and their corresponding change in area is linearly proportional to the value of acceleration in the direction of the axis. This difference in area can readily be detected by noting the difference in capacitance across each of the dielectric coverings 27 on the end pieces. Since the capacitance across a dielectric surface is a linear function of the common conductive surface area on both sides of it, and because the conductive surface area formed by the mercury on one side of the end piece dielectrics is a linear function of the applied axial acceleration, the change in capacitance across either or both of them will be a linear function of the applied acceleration.

Figure 3:
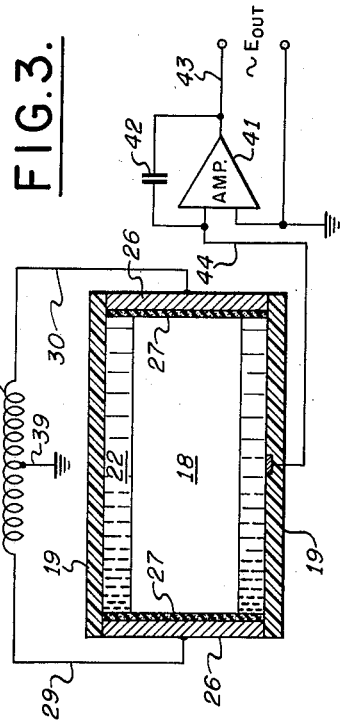
FIG. 3 is a schematic representation illustrating a manner of metering the embodiment of FIG. 1.

A method for detecting the change in capacitance across the end piece dielectric coverings is illustrated in schematic in FIG. 3. Here each of the capacitors formed by the dielectric coverings 27 is located in one branch of an inductive-capacitive bridge circuit. The inductance in each branch is formed of one-half of a transformer secondary winding 38 having a grounded centertap 39. A.C. input or excitation voltages are introduced by the transformer primary 40 to each of the inductive arms in phase opposed manner. Any difference in capacitance between the end pieces will result in a voltage change in the mercury 22 which connects them. This voltage is applied via conduits and slip rings to a high gain amplifier 41 to produce observable outputs. A capacitive feedback loop 42 is connected between the amplifier output 43 and input 44 to provide stabilization.

A preferred embodiment of the present invention is shown in FIGS. 4 and 5. The device is seen to be basically similar to that described previously. The present embodiment structurally distinguishes, however, in the provision of an electrically conductive cylinder 45 within the enclosure 18 and which is rigidly attached to the rotor assembly by means of shafts 46 extending along its axis. The enclosure thus assumes the general shape of the outer surfaces of the cylinder, and comprises a circumferential portion 52, around the periphery of the cylinder, communicating with two disc shaped end spaces 54, at either end of the cylinder. A second structural distinction from the previous embodiment is the elimination in the present device of the dielectric coverings 27 over the conductive inserts 26 in the plastic end pieces, and in the provisions of a conductive liner 47 on the outer cylindrical surface of the enclosure. It is to be noted that the conductive liner is electrically isolated from the conductive end piece inserts 26. Both the liner 47 and the cylinder 45 are connected by means of conductors 48 and 60 to slip ring outputs 49 and 50. A final structural distinction over the previous embodiment is the use of a dielectric fluid 51 such as a silicone in place of mercury as the inertial mass.

In operation, the fluid under centrifugal forces distributes itself about the circumferential portion 52 of the enclosure and fills the space between the cylindrical surface 53 and the conductive liner 47. Under conditions of zero axial acceleration the fluid extends over each end of the cylinder to fill equal portions of the disc shaped end spaces 54. The remainder of these spaces is filled with air. During finite axial acceleration, the fluid in the circumferential space 52 will tend toward the disc shaped space 54 at one end of the enclosure but will be partially restrained by the centrifugal pressure being developed there. As the axial acceleration is increased, more fluid will be moved into this end space, causing an increase in the centrifugal restraining force. A balance will thus be attained and the amount of fluid in either end space will be a function of the applied axial acceleration. In order to ensure that only axial acceleration and centrifugal forces influence movement of the liquid, a vent 55 is provided in the cylinder to permit air to flow from the end space into which the fluid is moving. It can be seen that the size of each of the circles 56 described by the centrifugally restrained surface 57 of the fluid in either end space has changed under acceleration by an amount 58 and 58'. The change in area of the circles may be shown to be a linear function of the applied axial acceleration. This area may be detected electrically by using the fluid in the end space as a capacitive dielectric and the conductive end piece inserts 26 and the ends 59 of the conductive cylinder as capacitive plates on either side of the dielectric. The capacity between the conductive surfaces will then be a linear function of the amount of dielectric fluid between them and consequently a linear function of the applied acceleration.

FIG. 6 illustrates schematically a method for detecting the relative change in capacitance at either end of the preferred embodiment. This method is basically identical to that shown in FIG. 3. One important distinction, however, is that changes in capacitance are effected by the movement of the dielectric portion of the capacitors while previously movement of a conductive portion produced the changes in capacitance. A second significant distinction is that the feedback capacitor in the present embodiment is made a part of the accelerometer itself. The output of the amplifier is seen to be connected to the conductive liner 47 of the cylindrical enclosure which serves as one plate of a capacitor. The surface 53 of the conductive cylinder 45 serves as the opposite plate and is inherently connected to the end plate of the cylinder.

The output of the amplifier in the circuit illustrated is a function of the ratio between the difference in capacitance at each end of the accelerometer and the feedback capacitance. Because the same acceleration sensitive fluid is used as the dielectric media for all three capacitors, it can be seen that the resulting amplifier output will be independent of the value of the dielectric constant of the fluid.

It should be noted that the speed of rotation of the accelerometer and viscosity of the acceleration sensitive fluid may be adjusted to give optimum damping and consequent rapid response. This area of adjustment is made very flexible by the independence of the density and dielectric constant of the liquid on the output voltage. The centrifugal forces developed may be increased to a point where cross axis components of acceleration will not affect the area shape or position of the circles described on the end pieces. Also because only viscous constraint is involved, these forces will have no effect upon the ability of the liquid to respond to axial accelerations.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A means for measuring accelerations along a prescribed axis, said means comprising a right cylindrical enclosure symmetrical about said axis, said enclosure filled with two mutually indissoluble fluids having different densities, one of said fluids being electrically conductive, the other being essentially nonconductive, one of said fluids being substantially incompressible, means for rotating said cylinder and said fluids about said axis, said enclosure having electrically conductive ends electrically insulated from said fluids by means of nonconductive coverings, a source of alternating voltage applied in phase opposed manner to each of said conductive ends, and means for measuring the electrical potential of said conductive fluid.

2. An accelerometer comprising a cylindrical enclosure filled with two mutually indissoluble dielectric fluids of different densities and different electrical permittivities, one of said fluids being substantially incompressible, means for rotating said cylindrical enclosure about its axis, a first pair of closed spaced flat circular electrically conductive surfaces generally transverse to said axis within said enclosure, said surfaces being of a diameter between the inner and outer diameters of a cross-section of the shape assumed by the denser fluid under centrifugal rotation, a second pair of electrically conductive surfaces within said enclosure, said second pair being similar to but axially displaced from said first pair, means for electrically connecting one surface from each of said pair, means for applying an alternating voltage in phase opposed manner to each of the remaining surfaces, and means for observing the voltage along said connecting means.

3. The device described in claim 2, wherein each of said remaining surfaces forms an end of said cylindrical enclosure.

4. The device described in claim 3, wherein said connecting means comprises an electrically conductive cylinder, coaxially and centrally disposed within said enclosure, each of said electrically connected surfaces forming an end of said cylinder.

5. The device described in claim 4, wherein said fluids include a dielectric liquid having a high electrical permittivity and air.

6. The device described in claim 5, wherein said observing means includes an electrical voltage amplifier having an input connected to said electrically conductive cylinder, and a capacitor connected in parallel circuit arrangement with said amplifier, said capacitor including an electrically conductive cylindrical surface defining the sides of said cylindrical enclosure, said surface electrically isolated from said ends of said cylindrical enclosure, whereby said cylindrical surface and the surface of said connecting means form the plates of said capacitor and the liquid therebetween forms the dielectric media of the capacitor.

7. A device for measuring magnitudes of acceleration along a predetermined axis, said device comprising means for constraining a first fluid to movement along a direction parallel to said axis, means restraining the movement of said fluid, said restraining means comprising a plurality of axially displaced centrifugal pressure heads communicating with said constraining means, said pressure heads each being developed through the centrifugal effects of the rotation of cylindrically enclosed quantities of said first fluid and a less dense fluid, said fluids being mutually indissoluble, one of said fluids being substantially incompressible, and means for ascertaining the relative areas described by said fluids on planes perpendicular to said axis at said axially displaced pressure heads to indicate the magnitude of acceleration along said axis.

8. An accelerometer comprising an enclosure filled with two mutually indissoluble fluids having different densities, one of said fluids being substantially incompressible, a pair of substantially parallel planes within said enclosure, an axis passing perpendicularly through said planes, means for centrifugally distributing said fluids about said axis to a degree sufficient to maintain the higher density fluid in contact with both said planes and away from the axis between the planes, and means for detecting the change in areas enclosed by the higher density fluid on said planes to determine components of acceleration along said axis.

9. An accelerometer comprising an enclosure filled with two mutually indissoluble fluids having different densities, one of said fluids being substantially incompressible, the boundaries of said enclosure including a pair of substantially parallel planes, an axis passing perpendicularly through said planes, means for centrifugally distributing said fluids about said axis to a degree sufficient to maintain the higher density fluid in contact with both said planes and away from the axis over its entire length and means for detecting the change in area described by one of said fluids on one of said planes under conditions of acceleration along said axis.

10. An accelerometer comprising a substantially right cylindrical enclosure filled with two mutually indissoluble fluids having different densities, one of said fluids being substantially incompressible, means for centrifugally distributing said fluids about the longitudinal axis of said enclosure to a degree sufficient to maintain the higher density fluid in contact with both ends of said cylinder and away from said axis over its entire length and means for detecting the change in area described by one of said fluids upon one end of said cylinder under conditions of acceleration along said axis.

11. An accelerometer comprising a substantially right cylindrical enclosure filled with two mutually indissoluble fluids having different densities, at least one being substantially incompressible, means for centrifugally distributing said fluids about the longitudinal axis of said enclosure to a degree sufficient to maintain the higher density fluid in contact with both ends of said cylinder and away from said axis over its entire length, a variable capacitor located within said enclosure nearer one end thereof, said capacitor comprising a high dielectric element between first and second closely spaced conductive elements, two of said capacitor elements being solid and having flat surfaces substantially perpendicular to said axis, the portion of one of said fluids in contact with said solid elements forming the third capacitor element, the electrical characteristics peculiar to said third capacitor being exhibited to a greater degree by said one fluid than by said other fluid, said other fluid being nonconductive, means in the vicinity of said axis and means near the circumference of said enclosure for communicating the bulk of said fluids with the respective portions in contact with said capacitor elements and means for observing variations of said capacitor.

12. An accelerometer comprising a right cylindrical enclosure filled with two mutually indissoluble fluids of different densities, at least one being incompressible, means for centrifugally distributing said fluids about the longitudinal axis of said enclosure to a degree sufficient to maintain the higher density fluid in contact with both ends of said cylinder and away from said axis over its entire length, said enclosure containing near one end thereof first and second capacitor elements characterized by a high electrical conductivity, said elements having closely spaced flat surfaces perpendicular to said axis, said closely spaced surfaces being separated by a third capacitor element which is characterized by a high electrical permittivity, two of said elements being solid and fixed with respect to said enclosure, the remaining element comprising a portion of one of said fluids, the other of said fluids being electrically non-conductive, the electrical characteristic peculiar to said remaining capacitor element being substantially different in each of said fluids, means for communicating the portions of said fluids in contact with said solid capacitor elements with the bulk of said fluids, and means for indicating the change in capacitance between said electrically conductive capacitor elements under conditions of acceleration along said axis.

References Cited in the file of this patent

UNITED STATES PATENTS

| | | |
|---|---|---|
| 2,319,940 | Marrison | May 25, 1943 |
| 2,662,956 | Bareford | Dec. 15, 1953 |
| 2,711,490 | Wilcox | June 28, 1955 |
| 2,840,366 | Wing | June 24, 1958 |
| 2,871,703 | Walker | Feb. 3, 1959 |
| 2,928,667 | Peterson | Mar. 15, 1960 |
| 2,938,390 | McFee | May 31, 1960 |